July 17, 1956
G. A. LYON
2,754,941
WHEEL COVER WITH AIR CIRCULATING MEANS
Filed May 23, 1951
2 Sheets-Sheet 1
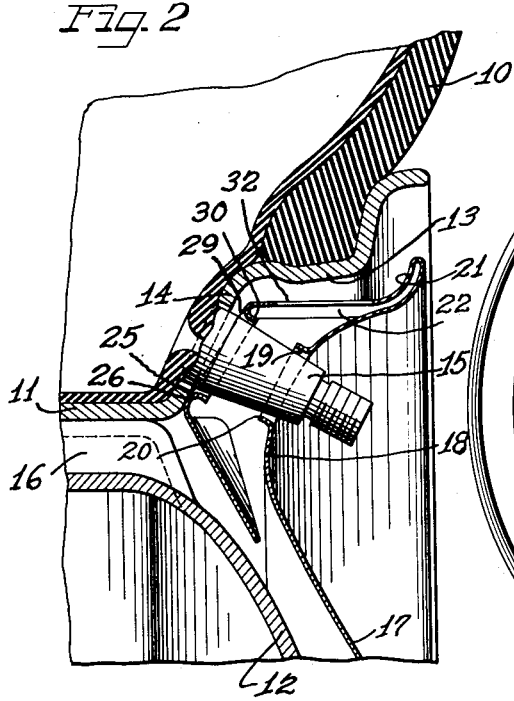
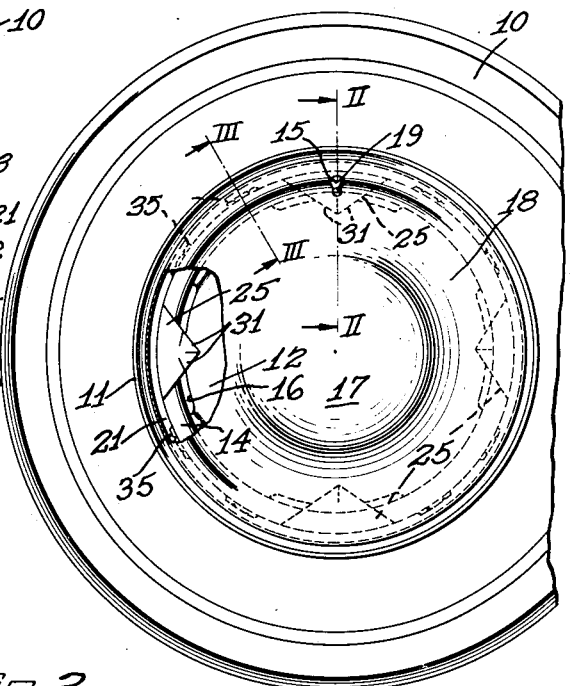
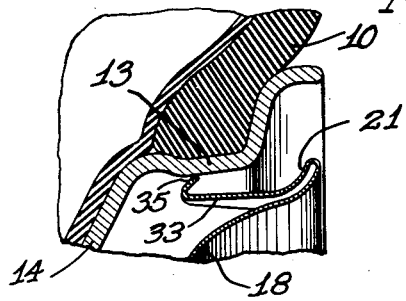
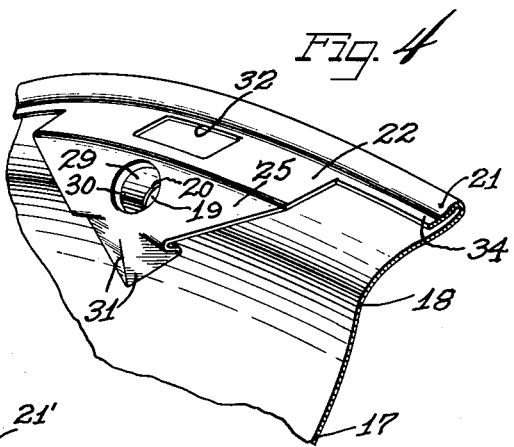
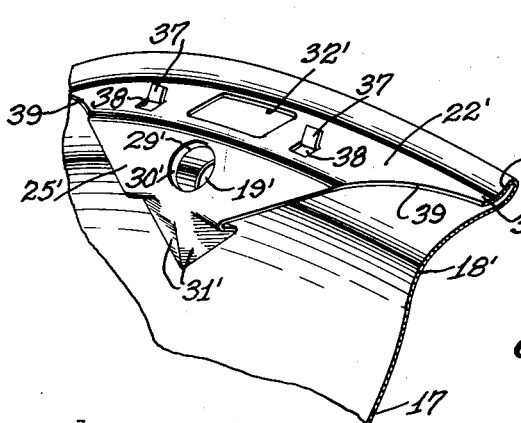
Inventor:
George Albert Lyon July 17, 1956  G. A. LYON  2,754,941
WHEEL COVER WITH AIR CIRCULATING MEANS
Filed May 23, 1951  2 Sheets-Sheet 2

Inventor:
George Albert Lyon
by Hill, Sherman, Meroni, Gross & Simpson Attys

United States Patent Office 2,754,941
Patented July 17, 1956

2,754,941

WHEEL COVER WITH AIR CIRCULATING MEANS

George Albert Lyon, Detroit, Mich.

Application May 23, 1951, Serial No. 227,899

12 Claims. (Cl. 188—264)

This invention relates to automobile wheel covers and more particularly to retaining means for detachably holding the cover on the outer side of a wheel.

An object of this invention is to provide improved retaining means for a wheel cover for detachably holding the cover on the wheel as well as improved centering means for cooperation with a valve stem in the positioning of the cover on the wheel.

Another object of this invention is to provide a wheel cover with improved means to prevent creepage of the cover on the wheel as the wheel rotates.

Yet another object of the invention is the provision of retaining means for a wheel cover which can be economically formed out of corners of the blank from which the cover is stamped.

Still another object of the invention relates to the formation of the retaining portions of the cover with a ventilating opening and deflecting means for assisting in the directing of air through the opening and the interior of the wheel.

In accordance with the general features of this invention there is provided a circular wheel cover for cooperation with a multi-flange drop center tire rim. The cover has its outer peripheral portion underturned into a rearwardly extending flange provided with spaced retaining portions formed with radially and axially outwardly extending fingers, each of narrow radial depth and each having an edge for retaining engagement with a rim flange, and at least one of said portions being provided with gripping means for engagement around the base of the valve stem to assist in centering the cover and in preventing creepage of the cover on the wheel.

Another feature of the invention relates to the forming of the spaced retaining portions and fingers of the cover out of corners of a blank from which the circular cover is stamped.

Another feature of the invention relates to the forming of the radially inner extremity of each of the retaining portions into air deflecting vanes for assisting in distributing and directing air through apertures in said retaining portions so as to facilitate the circulation of air through the part of the wheel inside of the rim.

Other objects, features and advantages of the present invention will be readily apparent from the following detailed description of certain preferred embodiments thereof taken in conjunction with the accompanying drawings, in which:

Figure 1 is a fragmentary side view of a wheel showing my novel cover applied thereto and partly broken away to illustrate more clearly certain of the cover retaining portions;

Figure 2 is an enlarged fragmentary cross-sectional view taken on substantially the line II—II of Figure 1;

Figure 3 is an enlarged fragmentary cross-sectional detail view taken substantially on the line III—III of Figure 1;

Figure 4 is a fragmentary rear view of a portion of the cover showing in perspective the construction of one of the position maintaining and vane portions of the cover;

Figure 5 is a fragmentary rear view of a portion of a modified form of the cover showing in perspective the construction of one of the combined position maintaining, cover retaining and vane portions of the cover.

As shown on the drawings:

Figure 6:
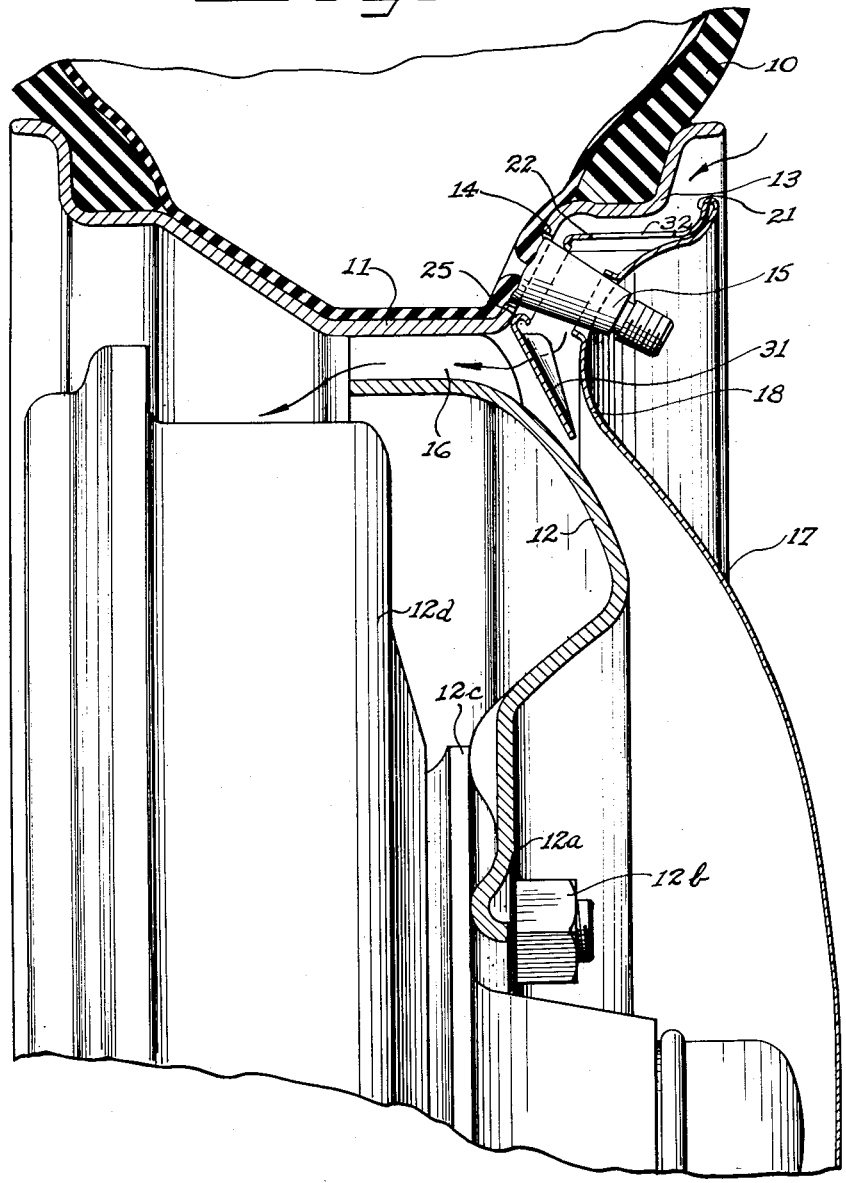
Figure 6 is a fragmentary cross-sectional view similar to Figure 2 but showing the relationship of the wheel and the cover to a vehicle brake drum.

The subject matter of this application is a continuation in part of my copending application Serial No. 113,815, filed September 2, 1949, now abandoned.

The reference character 10 designates generally a conventional pneumatic tire and tube assembly mounted in the usual way upon a multi-flange drop center type of tire rim 11 which is in turn carried by the usual wheel body or supporting member 12. This supporting member 12 may be dished centrally into a bolt-on flange 12a (Fig. 6) as is customary, by means of which the wheel may be attached in a conventional manner as by bolts 12b to an axle flange structure 12c of an automobile wheel having thereon a brake drum assembly 12d.

The flanged rim 11 includes at least one generally axially extending flange 13 of which use is made in the retaining of my cover on the wheel as will be hereinafter described. Also, one of the flanges comprises a side flange 14 which is apertured in the usual way to accommodate a conventional valve stem 15 of the tire and tube assembly 10.

In addition the wheel body member 12 has a plurality of transverse openings 16, of any suitable conventional construction, adjacent the base of the rim and which are at present employed to let air circulate through the wheel around the brake drum (not shown).

Cooperable with this conventional wheel assembly is a circular sheet metal wheel trim or cover 17 embodying the features of this invention. This cover has an intermediate dished portion 18 provided with a circular opening 19 defined by a flange 20 and through which the outer end portion of the valve stem 15 is adapted to extend so as to be accessible to the exterior of the cover without requiring removal of the cover from the wheel. The flange 19 is adapted to snugly, but not tightly, fit around the valve stem in a manner well known in the art.

The outer peripheral portion of the cover 17 is turned back upon itself into an annular concealed flange 21 which in turn is provided with a plurality of inwardly projecting position maintaining portions designated, generally by the reference character 22. These portions 22 are concealed behind the cover when looking at the cover from the outer side of the cover and may be of any suitable number, although they can be ideally made four in number since in that event they can be formed from four corners of a blank from which the circular cover is stamped.

Referring to Figures 1, 2 and 4, it will be perceived that each of the portions 22 is provided with a generally radially inward extension 25 adapted to abut at 26 against the inner margin of the side flange 14 of the rim 11 to limit inward axial movement of the cover. In other words, the cover, when it is pressed home onto the wheel, yieldably bottoms at 26 on the wheel.

One of the portions 25 is also provided with an aperture 29 aligned with the valve stem aperture 19 of the cover and defined by a flange 30 for snugly fitting around the base of the valve stem 15.

In wheel structures it is at present the practice to use rubber valve stems 15. Such a valve stem is relatively flexible at its outer extremity or at its outer end portion engaged by the flange 19 and this would tend to bend and escape from the cover aperture upon turning of the cover as may be caused by torque in service. By having the cover engage the base of the stem as by the flange 30, the cover is enabled to more firmly grip the valve stem in a part of the stem that is relatively stiffer and is substantially held against bending by close association with the tire rim. In this manner rotary creepage of the cover on the wheel as it rotates can be prevented. This relationship also assists in properly placing the cover on the wheel in centered relation.

In addition the distal extremity portion of each of the extensions 25 is provided with divergent radially inwardly projecting vanes 31—31 to extend opposite and across the outer sides of the wheel openings 16 and adjacent to the supporting body member 12. Thus, as the air circulates through the openings 16 with respect to the brake drum 12d these vanes or blades, upon rotation of the wheel, act as a fan to circulate the air through the space between the peripheral flange 21 and the rim of the wheel, substantially as indicated by directional arrows in Fig. 6.

At present automobile manufacturers are vitally concerned with circulation of air in the wheel body so as to keep the brake drum cool. Thus, it will be appreciated that my cover, in addition to serving its ornamental function, acts to assist in the actual cooling of the brake drum on the wheel.

It will be observed especially from Figures 2 and 6 that the body of the cover and more particularly the dished annular portion 18 of the cover is held in substantially spaced relation from the tire rim by the members 22 and thereby a substantial air circulation space is provided within which the vanes 31 are operative. It will also be observed that the underturned flange 21 is maintained in substantially spaced relation of the tire rim and therefore movement of air behind the cover between the flange 21 and the tire rim is substantially facilitated. As a further air circulation assistance feature, each of the members 22, which for practical reasons is formed relatively wide, is provided with an air circulation opening 32 of substantial dimensions.

While the inward extension members 22 maintain the cover in spaced relation to the tire rim, additional means on the underturned flange 21 are preferably provided for retaining the cover on the wheel against unintentional axial displacement.

Herein such means comprise a plurality of axially inward extensions 33 formed on a generally axially inwardly extending annular resilient and continuous extension 34 of the underturned flange 21 intermediate the spacer extensions 22. Each of the retaining extensions 33 comprises a resilient finger having a generally radially and axially outwardly extending retaining terminal portion 35 which retainingly grips the intermediate flange 13 of the tire rim as best seen in Figure 3. There may be a substantial plurality of the retaining fingers 33, such as 8, two being provided in each space between the spacer extensions 22.

Normally, when the cover is off of the wheel, the edges of all of the finger terminal flange portions 35 are arranged generally in a circle of a diameter slightly greater than the greatest diameter of the inner surface of the flange 13 to be engaged thereby so as to require flexing radially inwardly as the cover is pressed axially home onto the wheel. This enables the fingers 33 to engage the rim flange 13 firmly and yet be detachable therefrom upon the application of a pry-off force to the outer flange 20 of the cover as by means of a screw driver or the like.

In the modification of Figure 5, the cover is preferably of substantially the same construction as the cover of Figure 1 and similar parts are designated by primed reference numerals, the cover generally being designated 17', etc.

However, instead of the position maintaining portions or spacer extensions 22' serving only the one function of spacing the cover, they also serve as retaining means for engagement with the tire rim intermediate flange 13 to retain the cover against axial displacement from the wheel. For this reason, each of the spacer extensions 22' is preferably provided with retaining means, herein in the form of radially outwardly and generally axially outwardly inclined retaining fingers 37 each of which presents a blunt edge for tightly gripping the surface of the rim flange 13. It will be observed that the retaining fingers 37 are preferably struck out of the body portion of the spacer extension 22' at respectively opposite sides of the ventilation opening 32' and that thereby additional ventilation openings 38 are provided in the body of the spacer extension.

The retaining fingers 37 are of relatively shallow radial depths and are in themselves relatively rigid and stiff as compared to the portion 22' in general. Since the spacer extension portions 22' are discontinuous or have recesses between them and are provided with preferably arcuate tapering sides 38 merging with the continuous axial, and relatively rigid underturned flange 21'—34', the extension portions 22' or rather the axially extending body parts thereof are relatively resilient and hence can yield generally in the radial direction in the application and removal of the cover. As a consequence, the fingers 37 which in the off the wheel relation of the cover are arranged generally in a circle of a diameter slightly greater than the greatest diameter of the inner surface of the flange 13 engaged thereby, can move radially inwardly not by flexure of themselves but by reason of the flexure of the body portions of the extensions 22'. This enables the fingers to firmly engage the rim flange 13 and yet be detachable therefrom by the application of a pry-off force to the outer flange 21' as by means of a screw driver or the like interposed therebetween and the tire rim.

It will be understood that modifications and variations may be effected without departing from the scope of the novel concepts of the present invention.

I claim as my invention:

1. In a cover for a wheel including a multi-flange drop center tire rim having a valve stem projecting therefrom and a supporting body member therefor, a circular cover having an underturned inwardly extending flange provided with spaced yieldable position maintaining portions formed with radially and axially outwardly inclined fingers, said cover having a valve stem aperture spaced from one of said portions and said one portion having a part thereon providing an opening aligned with said aperture and defined by an edge for engaging around the base of a valve stem to assist in preventing creepage of the cover on a wheel, each of said portions also having a portion adapted to extend in assembly adjacent the supporting member and formed into vanes to act like fan blades in the rotation of the wheel cover for the purpose of circulating air behind the wheel cover.

2. In a wheel structure including a multi-flange drop center tire rim having a valve stem projecting therefrom and a supporting body member therefor, a circular cover having an underturned inwardly extending flange provided with spaced yieldable position maintaining portions formed with radially and axially outwardly inclined fingers retainingly engageable with the tire rim, said cover having a valve stem aperture spaced from one of said portions and said one portion having a part thereon providing an opening aligned with said aperture and defined by an edge for engaging around the base of a valve stem to assist in preventing creepage of the cover on the wheel, each of said portions also having a radially inward extension for yieldably bottoming against the base of the rim adjacent the supporting member to limit inward axial movement of the cover on the wheel, said extension in addition being formed into fan-like blades which in the rotation of the wheel are adapted to assist in forcibly circulating air behind the cover.

3. As an article of manufacture, a circular wheel trim having an outer portion provided with an aperture to receive the extremity of a valve stem and said outer portion having an underturned flange including a portion with an opening aligned with but spaced from said aperture and defined by an edge for closely opposing the base of a valve stem for the purpose of assisting in preventing rotary creepage of the trim on a wheel, said underturned flange portion being formed into vane-like blades for acting as a fan in effecting movement of air upon rotation of the wheel trim.

4. As an article of manufacture, a circular wheel trim having an outer portion provided with an aperture to receive the extremity of a valve stem and said outer portion having an underturned flange including a portion with an opening aligned with but spaced from said aperture and defined by an edge for closely opposing the base of the valve stem for the purpose of assisting in preventing rotary creepage of the trim on a wheel, said underturned flange portion having spaced retaining fingers for detachably holding the trim on a wheel, said underturned flange portion being formed into vane-like blades for acting as a fan in effecting movement of air upon rotation of the wheel trim.

5. In a cover for disposition at the outer side of a vehicle wheel having ventilation openings therein, the cover being adapted for disposition in concealing relation to the outer side of such a wheel, the cover having generally axially inwardly elongated spacer extensions adapted to engage a wheel to maintain the cover in spaced relation to a tire rim, said spacer extensions having angularly related fan blade means thereon, and additional inward extensions on the cover comprising retaining fingers for retaining gripping engagement with a tire rim for holding the cover against axial displacement from the wheel.

6. In a cover for disposition at the outer side of a vehicle wheel, a cover body having at the outer margin thereof a continuous generally inwardly extending annular flange, generally axially extending spacer portions projecting beyond the inner terminus of said flange spaced from one another and adapted to engage against the outer side of a wheel to which the cover may be applied, each of said spacer portions having a generally radially inwardly extending fan blade structure thereon disposed in spaced relation behind the body of the cover.

7. In a cover as defined in claim 6 wherein each of said extensions has generally radially outwardly extending cover retaining rigid fingers thereon.

8. In a cover as defined in claim 6 in which the axially extending flange has retaining finger extensions thereon intermediate the spacer extension portions.

9. In a wheel structure having air circulation openings therethrough and including a tire rim having a side flange merging with an intermediate flange from which extends a terminal flange, a wheel cover for disposition at the outer side of the wheel, said cover comprising a cover body having a marginal structure for overlying the tire rim and comprising inward extensions of substantial width engageable with said side flange to determine the axially inward disposition of said cover margin with respect to the tire rim, said extensions maintaining the margin of the cover in spaced relation to all of said flanges of the tire rim for air circulation behind the cover through said wheel openings, said extensions having air circulation openings therethrough so as to avoid any substantial impedance of said air circulation.

10. In a wheel structure having air circulation openings therethrough and including a tire rim having a side flange, a wheel cover for disposition at the outer side of the wheel, said cover comprising a cover body having a marginal structure comprising inward extensions of substantial width engageable with said side flange to determine the axially inward disposition of said cover margin with respect to the tire rim, said extensions maintaining the margin of the cover in spaced relation to the tire rim for air circulation behind the cover through said wheel openings, said extensions having air circulation openings therethrough so as to avoid any substantial impedance of said air circulation, said extensions having a generally radially outwardly extending fingers at certain of said ventilation openings therein, and said fingers being retainingly engageable with a generally radially inwardly facing flange of the tire rim.

11. In a wheel structure including wheel and tire rim parts with openings adjacent juncture of the parts and a generally radially inwardly facing intermediate flange portion on the rim part spaced radially and axially outwardly beyond said openings, a cover for disposition over the outer side of the wheel including a circular body portion for overlying said wheel openings, said cover having therebehind an annular series of generally axially inwardly extending flanges provided with radially outwardly projecting retaining finger edges for retainingly engaging under resilient tension with said radially inwardly facing rim flange, and provided with air vane portions extending to a substantial extent radially inwardly beyond said retaining finger edges to substantially opposite said wheel openings and turned relative to the cover to face generally circumferentially, said cover being spaced from the wheel for air circulation therebetween and through said wheel openings and said air motivating vane portions being in said space for assisting in such air movement in the rotation of the wheel.

12. In structure for a wheel including a flanged tire rim having a generally axially extending and radially inwardly facing annular flange, a circular cover member having a radially outer peripheral marginal portion for disposition over the tire rim, said marginal portion having attached therebehind generally axially inwardly extending flange means generally telescoping said axial tire rim flange behind said cover marginal portion, said flange means being provided with integral resiliently flexible portions having thereon generally radially outwardly projecting and facing edges which engage with said rim flange under resilient tension to retain the cover on the wheel, said flange means being also provided with integral portions projecting generally radially inwardly relative to said flexible portions and beyond the inner periphery of the tire rim to lie between the cover member and the wheel, said integral radially inwardly projecting portions affording at the radially inner portions thereof air motivating vanes for effecting movement of air behind the cover in the rotation of the wheel.

References Cited in the file of this patent

UNITED STATES PATENTS

| | | |
|---|---|---|
| Re. 22,410 | Lyon | Dec. 21, 1943 |
| 1,931,946 | Zerk | Oct. 24, 1933 |
| 2,143,950 | Kliesrath | Jan. 17, 1939 |
| 2,175,044 | Van Halteren | Oct. 3, 1939 |
| 2,368,228 | Lyon | Jan. 30, 1945 |
| 2,368,245 | Lyon | Jan. 30, 1945 |
| 2,371,952 | Cox | Mar. 20, 1945 |
| 2,433,854 | Lyon | Jan. 6, 1948 |
| 2,441,008 | Chase | May 4, 1948 |
| 2,600,410 | Lyon | June 17, 1952 |
| 2,633,944 | Butterfield | Apr. 7, 1953 |
| 2,669,487 | Horn | Feb. 16, 1954 |